May 16, 1933.    L. L. CALL    1,908,688
ELECTROTHERAPEUTIC APPARATUS
Filed June 6, 1929
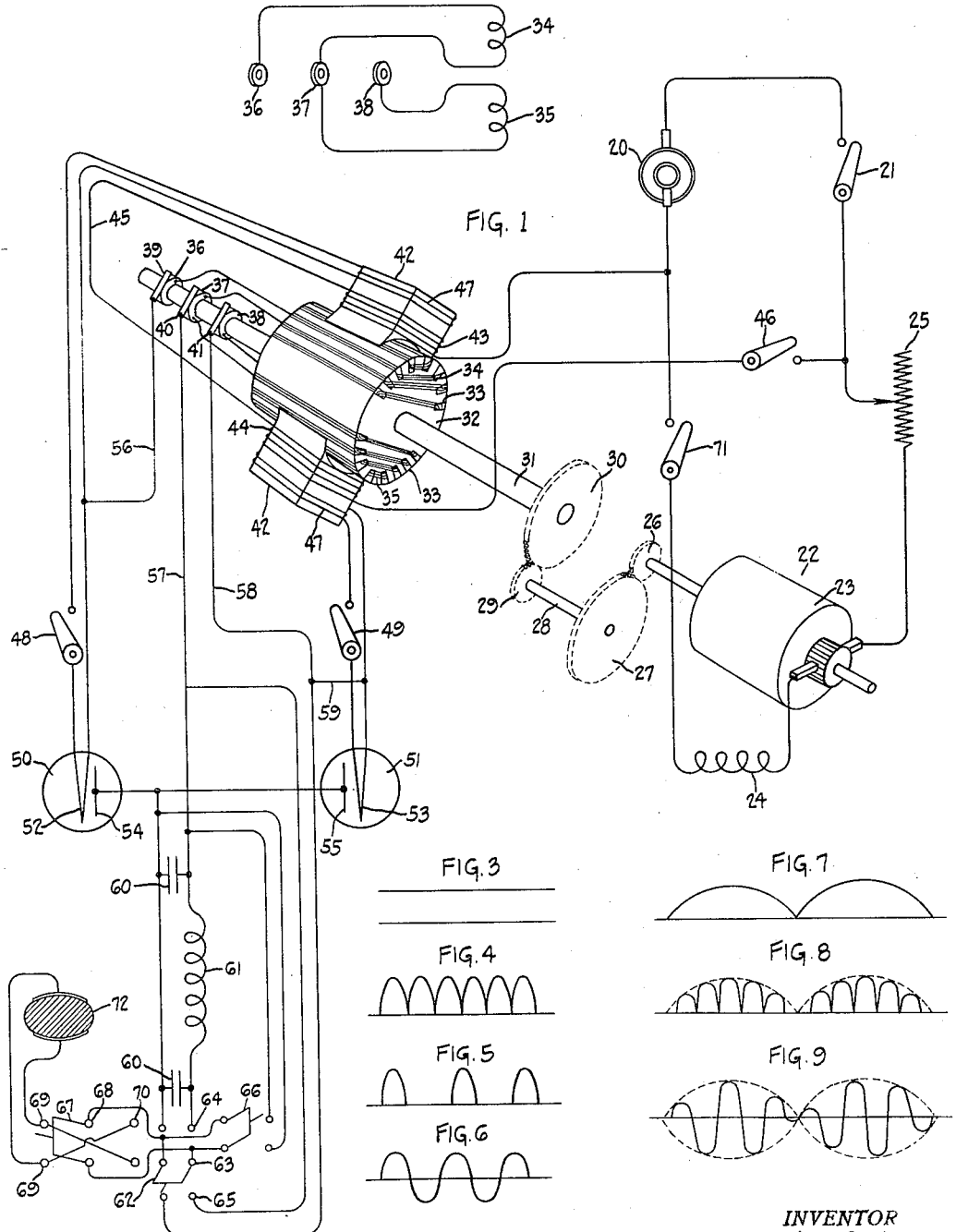
*INVENTOR*
LLOYD L. CALL
BY *[signature]*
*ATTORNEY*

Patented May 16, 1933

1,908,688

UNITED STATES PATENT OFFICE

LLOYD L. CALL, OF GLEN ELLYN, ILLINOIS, ASSIGNOR TO GENERAL ELECTRIC X-RAY CORPORATION, OF CHICAGO, ILLINOIS, A CORPORATION OF NEW YORK

ELECTROTHERAPEUTIC APPARATUS

Application filed June 6, 1929. Serial No. 368,821.

This invention relates to apparatus for the generation of currents suitable for use in electro-medical work.

In such work, a great number of different types of currents are employed, as for example, direct current, pulsating direct current, alternating current, surging direct current, and surging alternating current.

Control must be had of the several modalities, not only from a standpoint of voltage, but in the case of the alternating current and of pulsating direct current also from a standpoint of frequency.

By the control of the voltage, the desired amount of current passed through the human tissue is obtained. Control of frequency is essential to adjust the frequency of the selected current being impressed upon the patient to suit the particular portion of the body under treatment. All of this is well known in the art and further discussion thereof need not be given in the present application.

The present invention relates to the production of the several currents named in a circuit employing thermionic tubes, and the employment of novel switching means, the objects of the invention, among others, including the provision in electro-medical equipment, of rectifying and filtering means employing thermionic tubes; the adaptation in electro-medical apparatus, of means for changing current delivered from a rectifying and filtering equipment to alternating or pulsating current of a selected frequency; and the provision of a switching mechanism whereby currents may be obtained from various points in such an equipment for purposes later described.

The employment of thermionic tubes and filtering equipment for changing alternating to direct current is not new in the art. The application of such tubes, however, to the particular purposes herein described is new. By the use of the present system and apparatus, certain of the undesirable characteristics of older types of equipment are avoided.

In the generation of currents for electromedical use, one of the prime essentials of the apparatus is the adaptability thereof to the production of a very smooth current, that is, current in which ripples have been entirely eliminated. In the past, the elimination of ripples has been a very difficult matter because the rectifying elements associated with such devices were provided with brushes.

Practically all the generators of electromedical currents previously used have either operated from direct current or had a direct current generator as a part of the device. In either case a commutating device was the source of current. Commutators are notoriously prolific sources of ripples as very nearly perfect brush contact must be had to eliminate them. Not only is this condition hard to obtain but it is practically impossible to maintain under average operating conditions. As a result apparatus of the old type are usually apt to have so called "rough current" which is not only painful to the patient but sometimes even injurious.

The new apparatus forming the subject matter of the present application is illustrated in the attached drawing which shows one form or preferred embodiment of the invention.

Figure 1 of the drawing is a diagrammatic view of the circuits therein.

Figure 2 is a diagrammatic view of the rotor circuit of the rotary transformer employed in the apparatus.

Figure 3 is a curve showing the direct current produced.

Figure 4 is a curve showing one form of pulsating direct current produced in the device.

Figure 5 is a curve showing a second form of pulsating direct current so produced.

Figure 6 is a curve showing one form of alternating current which may be generated.

Figure 7 is a curve showing a third form of pulsating direct current obtainable in the device.

Figure 8 is a curve showing a so-called surging galvanic current which may be produced.

Figure 9 is a curve showing a surging alternating current also generated in the apparatus.

Like reference characters are employed to designate similar parts in the drawing and in the description of the apparatus hereinafter given.

In Figure 1, a source of alternating current which may be any suitable power line or generating device is designated 20. A switch 21 connects the source of alternating current 20 to the apparatus forming the subject of the present invention.

A motor 22 is provided for driving the rotor of a rotary transformer in which the armature is indicated by the ordinal 23. The fields associated with armature 23 are designated 24.

A variable series resistance 25 for regulating speed of motor 22 is associated with said motor.

A spur gear 26 is connected to the shaft of armature 23, and is in mesh with a spur gear 27, the latter being keyed to a shaft 28.

At the other end of shaft 28, is a gear 29 which engages a gear 30 attached to the shaft 31 of a rotary transformer.

Upon said shaft 31 is a rotary core 32, there being a number of slots 33 concentrated on opposite sides of said core 32.

One path 34 of rotor winding is concentrated on one side of rotor core 32, and the other half 35 of rotor winding is concentrated upon the other side thereof.

An outer slip ring 36 is attached to but insulated from armature shaft 31. This ring is connected to one terminal of armature winding 34. A center slip ring 37 is connected to the other end of armature winding 34 and to one end of armature winding 35. Inner slip ring 38 is connected to the other end of said armature winding 35.

A brush 39 cooperates with slip ring 36; a second brush 40 cooperates with slip ring 37; and a third brush 41 cooperates with slip ring 38.

There are provided stator cores 42 for the rotary transformer, upon which is a primary winding divided into two parts, one-half of the primary winding being marked 43 and the other 44, the two being on opposite sides of the transformer. A connecting conduit 45 is disposed between the two halves of the primary winding 43 and 44.

A switch 46 is arranged for energizing primary windings 43 and 44 from the source of power 20 which switch is effective only when switch 21 is closed.

Filament windings 47 for the thermionic tubes are also disposed on the stator cores 42. A switch 48 is provided for controlling the energization of the filament of a thermionic rectifier 50 from the upper filament winding, (Figure 1) and a second switch 49 for controlling the energization of the filament of a second kenetron 51 from the lower filament winding (Figure 1) is also disposed in the circuit.

In the description which follows, the left hand kenetron of Figure 1 is referred to as 50 and the right hand kenetron as 51, the filament of kenetron 50 being marked 52, and the filament of kenetron 51 being designated as 53. Each kenetron has a plate, the plate of kenetron 50 being marked 54, and that of kenetron 51 as 55.

A conductor 56 connects brush 39 to the filament circuit of kenetron 50, and a connector 57 from brush 40 runs to one side of the rectifier circuit. A conductor 58 is attached to brush 41. Another conductor 59 connects member 58 to the filament circuit of right hand kenetron 51.

Arranged in the filter are the by-pass condensers 60 and a choke coil 61. There is also provided a two-pole selector switch 62 to permit of the selection of either direct or alternating current, said switch having center terminals 63, upper terminals 64, and lower terminals 65.

Also in the circuit is a single throw double pole switch 66. A second double pole double throw switch 67 having center contacts 68, left hand contacts 69, and right hand contacts 70, is also provided.

A switch 71 may be associated with 22 for convenience.

The operation of the apparatus is as follows. After it has been connected to any suitable source of power, such as the source of power 20, switch 21 is closed. The motor 22 may now be energized by closing switch 71. The speed of the motor may be controlled by means of the rheostat 25.

Through the medium of the motor 22 and its associated gearing, rotor 32 of the rotary transformer is rotated. Switch 46 is next closed. The circuit thus closed energizes the primary windings 43 of the rotary transformer and causes current of the same frequency to be induced in the rotor windings 34 and 35.

As the rotor windings 34 and 35 are now rotated by the motor, and because of the variable magnetic coupling between rotor and stator, the current passing from the transformer changes with each complete rotation of the rotor from zero to a maximum, and back to zero, as a result of the concentrated type of winding employed, the current also reversing its direction each time said rotor makes such a revolution. The current thus produced will assume a wave shape similar to that shown in Figure 9. Control of the main frequency is had by control of motor speed, while the superimposed frequency is set by the frequency of current source 20.

The three conduits 56, 57 and 58 pass the current to the full wave rectifier comprising the two kenetrons 50 and 51. The filaments of the kenetrons are energized through the medium of the windings 47 and are controlled by means of the switches 48 and 49.

Current, after it passes through the rectifier tubes 50 and 51, assumes a wave shape similar to that shown in Figure 8 and it is then passed into a filter consisting of the condensers 60 and the inductance 61. The filter removes all the higher frequency ripples and produces a current of the form indicated in Figure 7.

If direct current is desired, switch 46 is opened. The rotary transformer then acts as a straight induction regulator which may be manually varied and delivers current of the type shown in Figure 6. When this current passes through the rectifier tubes, 50 and 51, it is changed into current of the wave shape shown in Figure 4.

If the output for only one tube, 50 or 51, is taken, every other alternation is dropped, and the current has the form indicated in Figure 5. If the current shown in Figure 4 is passed through the filter, the alternating current pulsations are smoothed out and a direct current of the type indicated in Figure 3 is had.

Switches 62, 66 and 67 are provided to permit of current being taken from various points in the circuit. The patient indicated at 72 is connected to contact points 69 of switch 68. Switch 67 is an ordinary pole changer and is provided for changing the instantaneous polarity of the posts 69.

Two busses are connected to the switch 66 and to the center 63 of the selector switch 62. When the selector switch 62 is thrown to contact with posts 64, the output through the filter is thrown on the patient's busses. When switch 66 is closed and 62 is open, current is taken from the input side of the filter circuit. By means of switches 48 and 49 one or the other, or both of kenetrons 50 and 51 can be cut into and out of circuit so as to obtain a wave form similar to Figure 5.

From the foregoing, it can be seen that by means of the switch mechanism shown, not only can the wave forms illustrated be obtained from this circuit, but various combinations of these wave forms may be had, all of which will be self-evident from the explanation herein given.

While there is shown the now preferred embodiment of the invention, it is not desired that the invention be limited thereto, but rather to the claims of the application which are to be construed in the broadest possible form which the state of the art will permit.

I claim:

1. An electrotherapeutic device comprising a source of alternating electric current, a motor energized by said current, a transformer comprising a stator primary and a rotor secondary, said primary comprising windings inducing current of the same frequency as the frequency of the energizing current, and said secondary comprising windings movable tangentially to said rotor, the relative position of said rotor to said stator varying the magnetic coupling between said rotor and stator, driving means between said motor and said rotor for rotating the latter at a selected speed, a patient's electrodes, and electrical conductors intermediate secondary windings to said electrodes.

2. An electrotherapeutic device comprising a source of alternating electric current of selected frequency, a motor energized by said current, a transformer comprising a stator having opposed legs and a rotor intermediate said legs and having windings concentrated thereon whereby to change the magnetic coupling between said rotor and said stator with each revolution of the latter, the current from said transformer during each revolution of the rotor changing from zero to maximum and back to zero and reversing its direction with each revolution, driving means intermediate said motor and said rotor, means for regulating the speed of said motor, and means for impressing the induced current from said transformer upon a patient.

LLOYD L. CALL.